United States Patent Office 2,704,291
Patented Mar. 15, 1955

2,704,291

TETRAHYDROFURFURYL ESTERS OF POLYCHLOROPHENOXYACETIC ACIDS

Gustave K. Kohn, Berkeley, Calif., assignor to California Spray-Chemical Corporation, Richmond, Calif., a corporation of Delaware No Drawing. Application April 16, 1951,
Serial No. 221,327

3 Claims. (Cl. 260—347.4)

The present invention relates to the discovery of new esters of polychlorophenoxyacetic acids, and particularly the tetrahydrofurfuryl esters of polychlorophenoxyacetic acids.

The tetrahydrofurfuryl esters of the polychlorophenoxyacetic acids exist as stable crystalline solids or viscous liquids under atmospheric temperature and pressure. The compounds are easily soluble in most organic solvents and substantially insoluble in water. The preferred esters of the invention are the tetrahydrofurfuryl esters of 2,4-dichlorophenoxyacetic acid and 2,4,5-trichlorophenoxyacetic acid. These compounds may be used in varied fields of application, such as agricultural chemicals, in the control of vegetation growth and as plasticizers or modifying agents in the preparation of resin, plastic and other synthetic polymer compositions, as well as synthesis intermediates, in the production of synthetic organic chemicals.

These esters may be prepared by condensation of the polychlorophenoxyacetic acid with tetrahydrofurfuryl alcohol in equimolar proportions in the presence of a dehydrating condensation or esterifying agent such as HCl, $H_2SO_4$, $H_3PO_4$, p-toluene sulfonic acid, etc. As a general proposition, caution must be exercised in the choice of the condensing agent, in view of the comparative instability of the tetrahydrofurfuryl alcohol. Since the esterification proceeds rapidly, a certain amount of decomposition may be indulged without affecting the yield of the desired ester. In the presence of strong acid condensing agents, the tetrahydrofurfuryl alcohol undergoes decomposition with the resulting production of pentanediols, and resinous polymer products.

In one of the preferred methods of preparation, the polychlorophenoxyacetic acid is heated under reflux with the tetrahydrofurfuryl alcohol in the presence of a water-immiscible solvent, such as benzene, toluene, xylene, ethylene chloride, etc., and a small proportion of a mild condensing agent, such as p-toluene sulfonic acid or phosphoric acid. In this manner, the esterification proceeds substantially quantitatively with a minimum alcohol decomposition. In order to offset any loss in yield, it is desirable to utilize a slight molar excess of the alcohol in the esterification. The esterification reaction may be initiated in the absence of the condensing agent to avoid decomposition of the alcohol, and after the autogenous reaction begins to slow down, the condensing agent may be incorporated into the reaction mass to complete the esterification. The resulting ester may be separated from the reaction mixture by the usual purification procedures in accordance with its projected application.

The following examples are presented as illustrating the preparation of representative esters of the subject invention with the understanding that the scope of the invention is not limited thereto.

Example I 255.5 grams (1 mol) of 2,4,5-trichlorophenoxyacetic acid and 107 grams (1 mol plus 4 grams excess) of tetrahydrofurfuryl alcohol (boiling point 178° C.) were heated together in a condensation vessel containing agitating means and an automatic water separator connected to a condenser in the presence of one gram of p-toluene sulfonic acid and 130 ml. of benzene. The reaction mixture dissolved at the point of reflux, which in this case was around 90–95° C. The esterification began immediately and was continued until the theoretical amount of water (18 grams) was removed. The rate of esterification varies with the quantity of catalyst used, and under the conditions employed herein, approximately six hours were required to obtain 99% esterification. After stripping off the the benzene solvent, the recovered product was a viscous reddish-brown liquid, which, after distillation to 150° C., analyzed about 93% ester with approximately 1% free acid. On cooling and standing, the 2,4,5-trichlorophenoxyacetic acid ester crystallized with diminution in volume, and the crude crystals were reddish in color. Recrystallization of the ester from hot kerosene with petroleum ether wash resulted in pure white needles, with a melting point of 48–49° C. The boiling point of the ester was 200–201° C. at 2 mm. of mercury and its refractive index ($n/D$) was 1.5545 at 22° C. before crystallization.

Example II 221 grams (1 mol) of 2,4-dichlorophenoxyacetic acid and 107 grams (1 mol plus 4 grams excess) of tetrahydrofurfuryl alcohol were heated in a condensation vessel equipped with a condenser and automatic water separator in the presence of 2 grams of p-toluene sulfonic acid and 100 ml. of benzene. Esterification proceeded rapidly with reflux at 90–93° C. A slight darkening of the reaction mixture was obtained and after 5 to 6 hours, the theoretical amount of water was recovered. After removal of the benzene solvent by stripping to 150° C., 337.5 grams of the ester product were recovered as a viscous reddish liquid. This yield corresponded to 91% ester, with approximately 1% free acid. The tetrahydrofurfuryl ester of 2,4-dichlorophenoxyacetic acid possesses a boiling point of 197–198° C. at 2–3 mm. of mercury with slight decomposition and a refractive index ($n/D$) of 1.5395 at 27° C.

Example III 2210 grams of 2,4-dichlorophenoxyacetic acid, 1050 grams of tetrahydrofurfuryl alcohol, and 1000 grams of benzene were heated in a 5-liter, 3-necked glass fitted with water separator and condenser. When the temperature reached 93° C., the acid was all dissolved and reflux started. In about four hours approximately 50% of the acid was esterified as determined by the collection of 90 ml. of water in the water separator. The rate of esterification had perceptibly decreased and at this point 3 grams of p-toluene sulfonic acid were added. The esterification continued and 180 grams of water (theoretical amount for complete esterification) was collected at the end of 10 hours. The reaction product was stripped of solvent by distillation to 145° C., and the remaining ester product was a brown liquid which remained liquid even at 0° F. and could not be crystallized even after seeding with crystals of the tetrahydrofurfuryl 2,4,5-trichlorophenoxyacetate or the isopropyl ester of 2,4-dichlorophenoxyacetic acid. The resulting tetrahydrofurfuryl ester of 2,4-dichlorophenoxyacetic acid possessed a boiling point of 212 to 217° C. at 5–7 mm. mercury.

Obviously, many modifications and variations of the invention as hereinbefore set forth may be made without departing from the spirit and scope thereof, and only such limitations should be imposed as are indicated in the appended claims.

I claim:
1. An ester of the group consisting of the tetrahydrofurfuryl ester of 2,4-dichlorophenoxyacetic acid and the tetrahydrofurfuryl ester of 2,4,5-trichlorophenoxyacetic acid.
2. Tetrahydrofurfuryl ester of 2,4-dichlorophenoxyacetic acid.
3. Tetrahydrofurfuryl ester of 2,4,5-trichlorophenoxyacetic acid.

No references cited.